Figure 2:
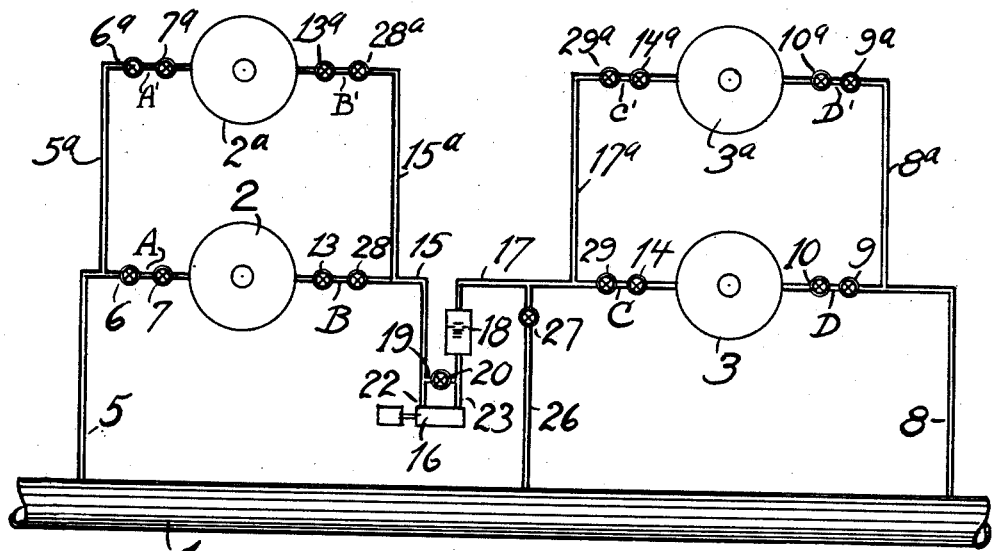

May 26, 1942.  H. G. CORNEIL  2,284,560

SAMPLING-PROPORTIONING DEVICE

Filed Aug. 10, 1940

Hampton G. Corneil Inventor
By P. L. Young Attorney

Patented May 26, 1942

2,284,560

UNITED STATES PATENT OFFICE 2,284,560

SAMPLING-PROPORTIONING DEVICE

Hampton G. Corneil, Baytown, Tex., assignor to Standard Oil Development Company, a corporation of Delaware Application August 10, 1940, Serial No. 352,125

3 Claims. (Cl. 137—165)

The present invention relates to an apparatus which is suitable for use either as a sampling device, as a means for injecting various liquids into a flowing stream, or if desired, for use in both capacities simultaneously. More particularly, the invention relates to apparatus of such type which may be operated so as to automatically accomplish the desired function, either at a constant rate, or in proportional relation to the flow of liquid through a pipe line or the like, without being affected by changes in pressure or rate of flow in the line.

In addition to the many sampling and proportioning contrivances which have as their purpose collection or dispensing of fluids over relatively short periods of time where accuracy of rate or quantity is not of prime importance, the art includes devices designed to collect or dispense fluids in proportional relation to static or dynamic pressures in the system connected therewith. Known in the art, also, are devices whose purposes are to sample pipe lines operating under fluctuating static pressures at a rate proportional to the quantity of fluid flowing through the pipe line. Known devices of this latter type are complicated, expensive, inaccurate and are unsatisfactory for use over relatively long periods of time such as, for example, one week or more; furthermore, their use, in most cases, is limited to the specific purpose for which they were designed.

I have now devised a simple, accurate and relatively inexpensive means for sampling at constant rates pipe lines and similar apparatus operating under fluctuating static pressures. This same means may be used equally as well for injecting liquids at constant rate into such equipment. By use of well-known means of remote control, my device can be operated in a manner whereby the sample is collected in proportional relation to the quantity of liquid flowing through the pipe line. It is one object of my invention to provide a sampling device so simple in nature as to minimize the danger of loss of sample should some part of the mechanism fail.

My invention may be used in two modifications, the preferred modification being dependent upon whether or not it is permissible or desirable to introduce a foreign liquid into the main pipe line. In either modification, however, a sampling circuit connected to and in parallel hook-up with the main pipe line is employed. In the case where it is permissible or desirable to inject foreign liquid into the main pipe line, the sampling circuit comprises in addition to the necessary piping and valves: (1) a receiving drum containing a body of transfer liquid in which the fluid being sampled is substantially insoluble, (2) a means, such as a pump, for actuating the fluid in the sampling circuit, (3) a unidirectional-flow check valve located downstream from the fluid actuating means and loaded (by means of a spring or weight) to such an extent as will provide a superimposed pressure drop in the sampling circuit sufficient in magnitude to render negligible the effect which changing hydrostatic head and/or friction drop have on the flow of liquid in the sampling circuit. In the case where it is not permissible or desirable to inject foreign liquids into the main pipe line, the sampling circuit comprises all the elements of the aforementioned case plus a discharge drum containing fluid of the same kind flowing in the main pipe line, said discharge drum being located down stream from the receiving drum.

Figure 1:
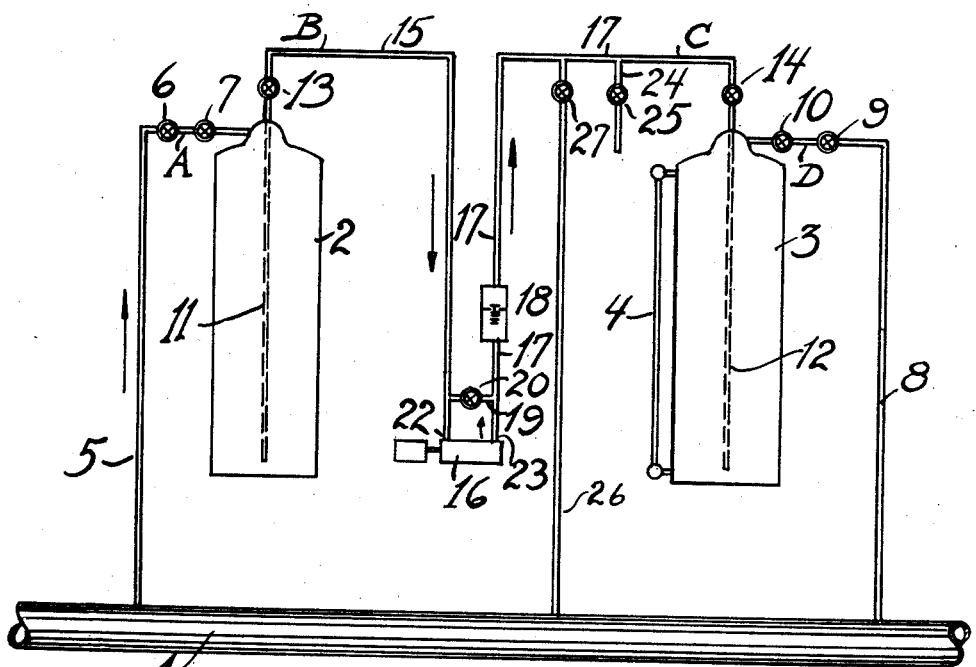

The invention, and its objects are more fully set forth in the following specification and will be readily understood when the specification is read in conjunction with the accompanying drawing, in which Figure 1 is a diagrammatic representation of an apparatus which may be used in two modifications, and Figure 2 is a diagrammatic plan of a system for continuous operation which may be used in two modifications, also.

In the drawing, the numeral 1 designates a pipe line or conduit through which is flowing a liquid such as crude oil or gasoline. At some point adjacent the conduit are disposed one or more receiving drums 2, and adjacent thereto, at substantially the same level, one or more discharge drums 3, of substantially equal capacity, the drums 2 and/or drums 3 being provided with some form of gauging devices such as gauge glass 4.

A sample line 5 connects the upper portion of each drum 2 to the conduit 1, and is provided with suitable valves 6 and 7 and means for disconnection at point A. Likewise each discharge drum 3 is connected into the conduit 1, downstream from the line 5, by means of the injection line 8 in which are suitable valves 9 and 10 and means for disconnection at point D. The line 8 should be spaced from line 5 sufficiently to prevent contamination of the sample by liquid from drum 3.

Both of the drums 2 and 3 are provided with internal pipes or conduits 11 and 12, respectively, which extend through the drum heads and are provided with valves 13 and 14. By means of these lines, the drums are interconnected through a conduit system composed of a line 15, a pump 16, and a line 17 in which is disposed a loaded check valve 18. Lines 15 and 17 are provided with means for disconnection at points B and C, respectively. Where pump 16 is driven by a constant speed motor and is designed to maintain a constant rate of flow under a constant differential pressure between the suction inlet at 22 and the discharge outlet at 23, as is preferable, the rate of sampling can be regulated to any desired value by employing a recycle line 19 which connects discharge line 17 with intake line 15 and in which is disposed a control valve 20 for regulating the amount of recycle and, consequently, the amount of sample withdrawn from the main pipe line 1. This valve 20 may be manually controlled or it may be provided for automatic operation by suitable means, not shown. Where pump 16 is driven by a variable speed motor, recycle line 19 and control valve 20 are not necessary since the rate of sampling can be controlled by varying the speed of the motor driving the pump. The regulation of the speed of the pump can be accomplished manually or automatically by means similar to that previously described for operating control valve 20.

If desired, a line 24 connected to line 17 and provided with a valve 25 may be employed as a convenient means for flushing out drum 3 preliminary to a sampling operation.

Although the above-described apparatus is particularly well adapted for use in sampling pipe lines where it is not permissible or desirable to inject foreign fluids into them, the apparatus may also be used in sampling operations where it is permissible to inject foreign fluids in the pipe line. In such instances I may modify the above-described apparatus by eliminating drum 3 and connecting line 17 directly with pipe line 1 such as by means of a line 26 in which is disposed a valve 27.

In an operation in which it is desired to sample a material such as oil flowing in conduit 1, the sample to be obtained at a constant rate from a liquid flowing through the conduit under a variable static pressure, the drums 2 are first filled with a liquid, such as water, having a higher specific gravity than that of the liquid in the conduit 1 and the drums 3 are filled with the liquid flowing through conduit 1, or, if desired, with an addition agent of some sort. The valve 18 is set for a pressure which will considerably exceed any normal pressure differential which may exist in the system, and with valves 6, 7, 9, 10, 13 and 14 open but with valves 25 and 27 closed, the pump 16 is set in operation at a constant speed. As is obvious from the drawings, water will be drawn from the drums 2 and discharged into drums 3, while the conduit material is simultaneously drawn into the drum 2 and the contents of drum 3 discharged into conduit 1. The rate at which the fluids in the sample circuit are moved is controlled by adjusting valve 20 to permit the proper amount of fluid to be recycled through the pump. Although the drums 2 and 3 are at substantially the same level, there will be a slight differential pressure in the system due to differences in the original contents of the drums, or to fluid friction in the system, and the like. In order to maintain constant and uniform flow from line 5 to line 8 when using some types of pumps, such as a plunger pump, it is necessary to employ a check valve 18 which is loaded to such an extent as will render negligible the changes in pressure drop in the sampling system due to changing hydrostatic heads, fluid friction, etc., so as to maintain a substantially constant pressure drop between the intake and discharge ports of the pump. In addition to this, check valve 18 provides sufficient back pressure on the pump to cause prompt seating of its valves as well as making possible control of the amount of fluid to be recycled through line 19, by adjusting valve 20, as an indirect means of regulating the rate of sampling. Although a load on check valve 18 equivalent to a pressure of 80 pounds per square inch has been found to be particularly well adapted for use on most pipe lines, it is to be understood that loads equivalent to much higher and much lower pressures may be satisfactory and desirable for use in some operations.

Under some circumstances, it is desirable that the system be operated at a variable rate in correlation with the flow of liquid through the conduit 1. In such instances, the flow-meter 21 may be adjusted in such manner as necessary to actuate the valve 20 in recycle line 19, whereby variations in the flow through the conduit 1 will open or close valve 20 so as to decrease or increase the volume of liquid delivered by pump 16 through line 17, and thereby decrease or increase in a like manner the volume of liquid drawn into the drums 2.

In the arrangement illustrated in Figure 2, a system is provided in which it is not necessary to interrupt the operation in order to change drums. The receiving drum 2a is also connected into the line 5 by means of line 5a in which is disposed valves 6a and 7a and means for disconnection at point A'. Similarly, discharge drum 3a is connected into the line 8 by means of line 8a in which are disposed valves 9a and 10a and means for disconnection at point D'. The drums 2a and 3a are also connected into the pump and pump conduit system by means of lines 15a and 17a, respectively. Line 15a is provided with valves 13a and 28a and means for disconnection at point B' between these valves. Similarly, line 17a is provided with valves 14a and 29a and means of disconnection at point C' between these valves. In this arrangement, lines 15 and 17 are each provided with one additional valve (28 and 29, respectively) over what is shown in Figure 1 for purpose of blocking the open lines when drums 2 and 3 are disconnected from the sampling circuit.

The above-described sampling system of Figure 2 is adaptable to all the uses and modifications as mentioned for the apparatus of Figure 1. That is to say, the system of Figure 2 may be modified to eliminate discharge drums 3 and 3a and to connect line 17 directly into pipe line 1 by means of line 26 where it is permissible and desirable to inject a foreign liquid into the main pipe line.

In use, when drums 2 and 3 have been filled to capacity, the former with liquid from conduit 1 and the latter with liquid from drum 2, the flow may be switched from drums 2 and 3 to drums 2a and 3a by suitable manipulation of the valves provided. Drums 2 and 3 may then be removed and replaced in readiness for a reconnection when drums 2a and 3a have to be removed from the sampling circuit.

Although the invention has been disclosed with reference to specific embodiment thereof, obviously various alternatives will be apparent which will not involve a departure from the broader concept. Therefore it is intended that the invention shall not be limited except to scope of the appended claims.

I claim:

1. Apparatus for sampling and for injecting liquid into a flowing stream of fluid at a constant rate, comprising a pipe line, a sampling circuit connected through a conduit to the pipe line at longitudinally spaced points, the circuit including a receiving drum in the circuit containing a body of transfer liquid in which the fluid is substantially insoluble, and fluid actuating means in the conduit to draw fluid from the receiving drum working against a unidirectional-flow check valve in the conduit loaded to provide a pressure drop in the sampling circuit greater than any fluctuations of static pressure in the apparatus, whereby fluid flows from the pipe line into the drum at a constant rate to displace the transfer liquid which is conducted to the pipe line.

2. Apparatus according to claim 1 in which the fluid actuating means is on the downstream side of the receiving drum.

3. Apparatus for sampling and for injecting liquid into a flowing stream of fluid at a constant rate, comprising a pipe line, a sampling circuit connected through a conduit to the pipe line at longitudinally spaced points, the circuit including a receiving drum in the conduit containing a body of transfer liquid in which the fluid being sampled is substantially insoluble, a discharge drum containing fluid of the same kind as flows in the pipe line and located downstream in the conduit from the receiving drum, and fluid actuating means in the conduit to draw fluid from the receiving drum working against a unidirectional-flow check valve loaded to provide a pressure drop in the sampling circuit greater than the fluctuations of static pressure in the apparatus whereby fluid flows from the pipe line into the drum at a constant rate to displace the transfer liquid which is conducted to the discharge drum.

HAMPTON G. CORNEIL.